United States Patent [19]

Turkia et al.

[11] Patent Number: 4,963,270
[45] Date of Patent: Oct. 16, 1990

[54] DECKER WITH PARTITIONS FOR FILTRATE FRACTIONS

[75] Inventors: Erkki Turkia, Inkeroinen; Jouko Hautala, Tampere, both of Finland

[73] Assignee: Oy Tampella Ab, Tampere, Finland

[21] Appl. No.: 344,569

[22] Filed: Apr. 28, 1989

[30] Foreign Application Priority Data

Apr. 28, 1988 [FI] Finland .................................. 881994

[51] Int. Cl.$^5$ ............................................ C02F 11/12
[52] U.S. Cl. ...................... 210/770; 162/18; 162/368; 210/247; 210/403; 210/784
[58] Field of Search ............... 162/327, 328, 329, 335, 162/357, 56, 60, 18, 368, 370, 259; 210/402, 403, 404, 407, 414, 784, 247, 770

[56] References Cited

U.S. PATENT DOCUMENTS

| | | | |
|---|---|---|---|
| 2,100,149 | 11/1937 | Qviller | 210/402 |
| 2,321,455 | 6/1943 | Byrne | 210/402 |
| 4,001,119 | 1/1977 | Hunter | 210/402 |
| 4,192,743 | 3/1980 | Bastgen et al. | 210/770 |
| 4,454,042 | 6/1984 | Dorcheus | 210/402 |
| 4,618,424 | 10/1986 | Lundin | 210/402 |
| 4,705,631 | 11/1987 | Hautala et al. | 210/403 |

FOREIGN PATENT DOCUMENTS

| | | | |
|---|---|---|---|
| 3706273 | 10/1987 | Fed. Rep. of Germany | 210/402 |
| 72051 | 12/1986 | Finland | 210/403 |
| 24835 | of 0000 | Sweden | 162/335 |

OTHER PUBLICATIONS

AGP Vargo Filter, Exim Oy AB, Helsinki, Finland.

Primary Examiner—Frank Spear
Assistant Examiner—Joseph Drodge
Attorney, Agent, or Firm—Pollock, Vande Sande & Priddy

[57] ABSTRACT

A decker comprises a tank having a thickening drum mounted rotatably therein and including a filtering shell. The inside of the drum communicates with an inlet for feeding mass, whose consistency is to be increased during the thickening process and outlets for discharging the thickened mass after the thickening process. The filtrate separated from the mass being thickened, is arranged in a flow communication from the inside of the thickening drum through the filtering shell of the drum to the bottom portion of the tank. At least one separating member is placed in the bottom portion of the tank outside the drum and forms a partition point or partition line situated transversely with regard to the direction of rotation of the drum and at a predetermined, angular distance from the horizontal plane coinciding with the axis of rotation. The partition point is arranged to accomplish the separation of the filtrate flowing through the filtering shell before and after the angular distance, as seen in the direction of rotation,. into at least two filtrate fractions.

20 Claims, 1 Drawing Sheet

DECKER WITH PARTITIONS FOR FILTRATE FRACTIONS

BACKGROUND OF THE INVENTION

The present invention relates to a decker apparatus and to a method for separating a filtrate from a mass whose consistency is to be increased.

The above-mentioned apparatus and method are well known especially in pulp and paper industry and used for thickening, that is for increasing the consistency of various liquid-solid-compositions, for example, for the recovery of fibres from the effluents of a paper factory. Such an apparatus is disclosed, for example, in Finnish Patent No. 72051. The filtering process is based on the buildup of a filtering layer constituted of solid particles, which become deposited on the inner surface of the thickening drum. The filtrate leaving the mass flows through this layer as the drum rotates, and the thickness of the layer increases in the direction of rotation off the drum. The filtering layer is removed from the inner surface of the drum continuously with the help of spraying means located above the drum, and after this point, as the drum rotates further, new continuously growing filtering layer will begin to build up. The mass to be thickened is fed to the inside of the drum in axial direction at the end of the drum and the thickened mass is discharged through overflow at the opposite end.

Further, a decker under name AGP Vargo Filter is known on the market. In this apparatus, however, the surface of the liquid filtered out of the drum into the vat is on a relatively high level, surrounding the filter shell of the drum from outside, which reduces the pressure that can be utilized in filtering. Further, the initial filtrate of higher solid content filtered through the drum shell at the beginning of the filtration cycle can easily mix with the rest of the filtrate, because it can flow into the filtrate of higher purity, the flow taking place between the filter shell and a split baffle, which is intended for separation of the initial filtrate.

SUMMARY OF THE INVENTION

It is an object of the invention to improve the above technique and to provide an apparatus and method which make it possible to obtain a filtrate having a higher purity than before. For realizing this object the decker of the present invention is provided with a partition point for the filtrate in such a fashion that the point is situated in the rotational direction of the drum at a predetermined angular distance from the horizontal plane coinciding with the axis of rotation of the drum such that, it is possible to separate the filtrate flowing through the filter shell into two different filtrate fractions on both sides of this point. When, for example, the procedure shown by the above-mentioned Finnish Patent No. 72051 is used, that is the filtration is so effected that the filter shell of the drum is not in contact with the liquid surface of the filtrate collected in the bottom portion of the vat, the fractions can be separated from each other with high precision.

According to one preferred embodiment of the decker of the invention the angular distance at which the partition point is situated is 45° to 180°. With such placing of the partition point it is possible to obtain filtrate having a low solids content. Even purer filtrate fractions are achieved when the partition point is placed at an angular distance of 90° to 180°, in which event the filtrate flowing through the filter shell after this point, as seen in the rotational direction of the drum, constitutes a fraction of particularly high purity. The required purity of the filtrate and the type of the mass to be thickened determine the location of the partition point in more detail.

The method in accordance with the present invention makes it possible to achieve the same benefits as referred to above. According to one preferred embodiment of the method of the present invention the filtration is so carried out in respect of each filtrate fraction that the filtrate flows through the filtering drum shell onto the free liquid surface present in the bottom portion. By doing so, the mixing of different fractions with each other can be avoided.

The invention will be explained in more detail in the following description with reference to the accompanying drawing, wherein

DETAILED DESCRIPTION OF THE PREFERRED EMBODIMENT(S)

Figure 1:
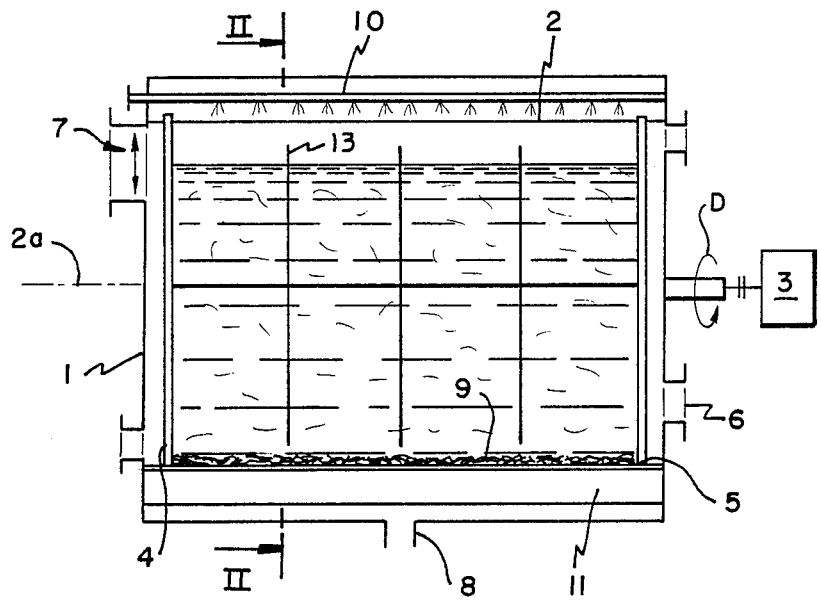
FIG. 1 is a sectional side view of the decker of the invention, taken in the axial direction of the filter drum.

The decker comprises a tank, vat or a like 1, having a thickening drum 2 mounted rotatably therein. The drum comprises a filtering shell and it is of open construction at its ends. The drum is rotated by means of a motor 3 in the direction denoted by arrow D. The axis of rotation of the drum is denoted in the Figures by reference numeral 2a. The ends of the thickening drum are sealed by means of packing rings 4, 5 in the ends of the tank 1. One of the ends is equipped with an inlet 6 for supply of the mass to be thickened to the inside of the thickening drum 2 in axial direction, and in the upper portion of the end that lies opposite to the first end there is arranged an outlet 7 for the overflow discharge of the thickened mass from the inside of the drum 2.

The filtering shell of the thickening drum 2 is formed of a filtration wire sieve or filtration fabric known as such, being mounted on the frame construction of the drum, as well as of a support wire or fabric which is tightened on the outside of the filtration wire sieve or filtration fabric. This construction contributes to a firm structure, which allows for the inside of the drum 2 to be almost entirely filled with the mass to be thickened, as the bottom portion of the tank underneath the drum is empty.

Figure 2:
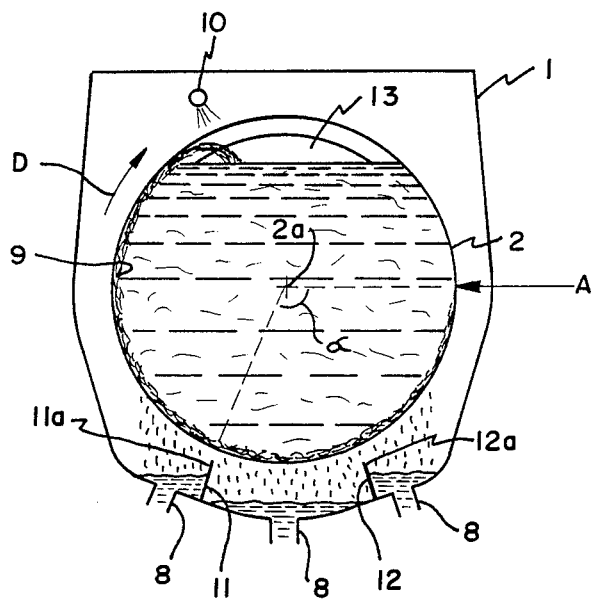
FIG. 2 is a cross-sectional view of the decker, taken perpendicularly to the axis of rotation of the filter drum along line II—II.

The operating principle of the decker is best shown in FIG. 2. The mass which will be thickened fills the inside of the drum almost entirely, leaving an empty space in the uppermost portion above the free liquid surface of the mass. Due to the hydrostatic pressure of the mass the filtrate flows through the filtering shell of the drum 2 into the bottom portion of the tank 1, being collected therein and removed therefrom through conduits 8. By regulating the removal of the filtrate via the conduits 8, the height of the liquid surface of the filtrate present in the bottom portion of the tank 1 can be adjusted. The filtration rate is highest when the free liquid surface of the bottom portion of the tank is not in contact with the filter shell of the drum 2. The pressure caused by the mass to be thickened can thus be utilized in maximum. As the drum rotates in direction D, a layer 9 of solids growing continuously in the direction of rotation is deposited on the inner wall of the drum. For example, when an effluent of a paper factory, such as white water from paper manufacturing process, is treated, this layer is mainly constituted of fibres. The layer also retains other solid particles which otherwise would penetrate through the filter shell and would be entrained with the filtrate. Hence, at the location where the filter shell is situated at the horizontal plane coinciding with the rotational axis 2a of the drum (arrow A) in the beginning of the revolution, the filtering layer is still thin and solids become entrained with the filtrate. Respectively, in the end of the revolution at the location situated at an angular distance of 180° from this location, seen in the direction of rotation, the thickness of the filtering layer on the inner surface of the shell is greatest. Hence, the filtrate flowing through the filter shell at this location has the lowest solids content. In the upper portion of the drum 2 at the location where the inner wall of the drum is situated above the surface of the mass to be thickened, the filtering layer 9 is subjected to a liquid spray using spraying means 10 located externally of the drum. The liquid spray flows through the support wire and through the filtration wire sieve, causing the detachment of the filtering layer 9 from the inner surface of the shell down into the mass. After passing this location, the inner wall of the shell is clean and the filtering layer will start its growth over again after the inner wall is again immersed into the mass.

It becomes apparent from the foregoing that in each portion of the shell, situated in the direction of rotation at a predetermined angular distance from the horizontal plane of the rotational axis 2a arrow A), there is present a filtering layer 9 of mainly constant thickness along the whole axial length of the drum, and the thickness of this layer increases as the angular distance increases. According to the present invention, in the bottom portion of the tank 1 there is mounted a partition wall, which lies parallel to the rotational axis 2a of the drum. The partition wall is denoted by reference numeral 11 in FIG. 1. The upper edge 11a of the partition wall 11 is situated closest to the drum shell, underneath the location of the shell situated at an angular distance $\alpha$ from location A. The filtrate flowing through the filter shell before this location remains on the right side of the partition wall 11 in FIG. 2, and the filtrate flowing after this location remains on the left side of the partition wall. Hence, the filtrate is separated in two different filtrate fractions having different solids contents, the fraction constituted of the filtrate flowed through the shell after the angular distance $\alpha$ having a higher purity. In FIG. 2 the angular distance $\alpha$ is about 110°, but the location of the partition wall is of course depending on the desired solids content of the pure filtrate fraction.

FIG. 2 also shows a second partition wall similar to the partition wall 11. The partition wall is denoted by reference numeral 12 and its upper edge 12a is situated below the location of the shell situated at an angular distance of approximately 70° from location A. The partition walls 11 an 12 thus form three collecting basins for filtrate fractions of different degree of purity in the bottom portion of the vat 1. The fraction highest in solids contents is collected in the basin located before the partition wall, as seen in the direction of rotation of the drum. The medium fraction is collected in the basin between the partition walls 11 and 12, and the fraction lowest in solids contents is collected in the basin situated after the partition wall 11a, as seen in the direction of rotation. From each basin the filtrate is discharged through the respective outlet conduit 8.

As to the separation of fractions, the best result is achieved, when in each basin the liquid surface of the filtrate does not join the filter shell of the drum 2, that is the filtrate flows through the filter shell of the drum on&to a free surface of the liquid.

The pure fraction obtained by means of the thickening apparatus of the invention can be used for purposes for which the solids content of a filtrate collected as a single fraction would be too high. The pure fraction obtained in accordance with the invention from an effluent containing fibres and discharged by a paper factory can be used in such a case, for example, in showers using recycled water, which decreases the total water consumption of a paper manufacturing process, because a greater portion of the water than before can be recycled. Further, the present invention makes it possible to divide the filtrate into fractions in such a fashion, that a filtrate suitable for a specific purpose can always be obtained.

The invention has been tested in the decker TAMDEC, manufactured by the applicant. The filtrate was fractionated, calculated on the basis of the volumetric flow rate, into one third of higher purity and the rest of a higher solids content. The solids contents of the filtrates were respectively 46 mg/l and 308 mg/l. It is thus possible to obtain relatively large amounts of filtrate of very high purity.

The invention is by no way restricted only to those embodiments of the decker which are shown by the Figures, but it can be modified within the scope of the invention represented by the claims. The construction of the bottom portion of the thickening apparatus may also be different from that shown by the Figures. It is sufficient for the purposes of the invention that the partition means in the bottom portion of the tank 1 form points separating the filtrate flowing through the shell in different basins and at the same time keep the filtrate fractions collected within the basins separated from each other. The above-described decker can also take advantage of all features known in connection with previous apparatuses in order to enhance its operation. The inside of the thickening drum 2 can be divided in successive spaces in the axial direction with the help of baffle plates, designated 13 in FIG. 1. Moreover, the flow of the mass to be thickened from the inside of the thickening drum can be regulated by adjusting the height of the overflow 7. The thickening apparatus can utilize other control possibilities as well, which are apparent to a man skilled in the art, such as the adjustment of the speed of rotation of the drum 2 for adjustment of the degree of the consistency of the mass.

We claim:
1. A decker, comprising:
a tank with a thickening drum mounted rotatably therein and having a filtering drum shell adapted to rotate together with the rotation of the drum;
feeding means communicating with the inside of said drum for feeding a mass therein, whose consistency is to be increased during the thickening process; and
discharging means also communicating with the inside of said drum for discharging the thickened mass after the thickening process;

the filtrate separated from the mass being thickened arranged in flow communication from the inside of said drum through said filtering drum shell to the bottom portion of said tank;

the inner surface of said filtering shell being adapted for collecting a layer formed of solids separated from the mass, the thickness of said layer at a predetermined angular distance from the horizontal plane coinciding with the axis of rotation of said drum and consequently the purity of the filtrate filtered through said filtering drum shell at said distance being proportional to the amount of said angular distance;

means for continuously removing said layer of solids from the inner surface of said filtering drum shell into the mass inside said drum at a predetermined distance from the horizontal plane; and separating means placed in the bottom portion of said tank outside said drum, said means forming at least one partition point or partition line situated transversely with regard to the direction of rotation of said drum and at a predetermined angular distance from said horizontal plane coinciding with the axis of rotation, the partition point being arranged to accomplish the separation of the filtrate flowing through said filtering drum shell before and after said angular distance, as seen in the direction of rotation, in two filtrate fractions; and a plurality of means in said bottom portion of said tank for continuously withdrawing said filtrate fractions from the decker, each at a substantially constant solids content differing from that of the other fraction.

2. A decker as claimed in claim 1, wherein the angular distance at the partition point is 45° to 180°.

3. A decker as claimed in claim 2, wherein the angular distance is 90° to 180°.

4. A decker as claimed in claim 3, wherein the separating means form at least two partition points for separation of the filtrate respectively in at least three filtrate fractions.

5. A decker as claimed in claim 3, wherein the separating means are formed of at least one arranged in the bottom portion and extending substantially parallel to the axis of rotation of the drum, the edge closest to the shell of the drum in the wall thus forming said partition point or partition line.

6. A decker as claimed in claim 2, wherein the separating means form at least two partition points for separation of the filtrate respectively in at least three filtrate fractions.

7. A decker as claimed in claim 2, wherein the separating means are formed of at least one partition wall arranged in the bottom portion and extending substantially parallel to the axis of rotation of the drum, the edge closest to the shell of the drum in the wall thus forming said partition point or partition line.

8. A decker as claimed in claim 1, wherein the separating means form at least two partition points for separation of the filtrate respectively in at least three filtrate fractions.

9. A decker as claimed in claim 8, wherein the separating means are formed of at least one partition walls arranged in the bottom portion and extending substantially parallel to the axis of rotation of the drum, the edge closest to the shell of the drum in the wall thus forming said partition point or partition line.

10. A decker as claimed in claim 1, wherein the separating means are formed of at least one partition wall arranged in the bottom portion and extending substantially parallel to the axis of rotation of the drum, the edge closest to the shell of the drum in the wall thus forming said partition point or partition line.

11. A method for separating filtrate from a mass to be thickened, comprising the steps of:

feeding the mass to be thickened to the inside of a thickening drum rotating within a tank;

causing the filtrate separated from the mass to flow from the inside of the drum, through a drum filtering shell, rotating together with the drum to the bottom portion of the tank;

effecting deposition of a layer formed of solids separated from said mass on the inner surface of said filtering shell in such a fashion that the thickness of said layer at a predetermined angular distance from the horizontal plane coincides with the axis of rotation of the drum and consequently the purity of the filtrate filtered through said shell at said distance is proportional to the amount of said angular distance;

continuously removing said layer from the inner surface of said filtering shell into the mass inside the drum at a predetermined distance from said horizontal plane;

separating the filtrate into at least two filtrate fractions using separating means positioned in the bottom portion of the tank outside the drum, in such a fashion, that said means form a partition point or line situated transversely to the direction of rotation of the drum and situated in the direction of rotation of the drum at a predetermined angular distance from said horizontal plane coinciding with the axis of rotation of the drum, thus separating the filtrate flowing through the shell before and after said angular distance into two filtrate fractions; and continuously withdrawing said filtrate fractions from the decker, through means provided in the bottom of the tank for each fraction at a substantially constant solids content differing from that of the other fraction.

12. A method as claimed in claim 11, wherein the angular distance of the partition point is 45° to 180°.

13. A method as claimed in claim 12, wherein the angular distance is 90° to 180°.

14. A method as claimed in claim 13, wherein the filtrate is separated in at least three filtrate fractions by means of at least two partition points.

15. A method as claimed in claim 13, wherein the filtration of each filtrate fraction is so effected that the filtrate flows through the filtering shell of the drum to a free liquid surface present in the bottom portion.

16. A method as claimed in claim 12, wherein the filtrate is separated in at least three filtrate fractions by means of at least two partition points.

17. A method as claimed in claim 12, wherein the filtration of each filtrate fraction is so effected that the filtrate flows through the filtering shell of the drum to a free liquid surface present in the bottom portion.

18. A method as claimed in claim 11, wherein the filtrate is separated in at least three filtrate fractions by means of at least two partition points.

19. A method as claimed in claim 18, wherein the filtration of each filtrate fraction is so effected that the filtrate flows through the filtering shell of the drum to a free liquid surface present in the bottom portion.

20. A method as claimed in claim 11, wherein the filtration of each filtrate fraction is so effected that the filtrate flow through the filtering shell of the drum to a free liquid surface present in the bottom portion.

* * * * *